Jan. 26, 1937.                H. W. PRICE ET AL              2,068,961
                             CLUTCH CONTROL MECHANISM
                                Filed Oct. 19, 1931

INVENTOR.
HAROLD W. PRICE
EARL R. PRICE
BY H. O. Clayton
ATTORNEY

Patented Jan. 26, 1937

2,068,961

UNITED STATES PATENT OFFICE 2,068,961

CLUTCH CONTROL MECHANISM

Harold W. Price and Earl R. Price, South Bend, Ind., assignors to Bendix Aviation Corporation, South Bend, Ind., a corporation of Delaware Application October 19, 1931, Serial No. 569,596

16 Claims. (Cl. 192—.01)

This invention relates in general to control mechanism for automotive vehicles and in particular to the clutch and throttle mechanism controlling the speed of the vehicle.

The invention is particularly designed as an improvement of the construction of Belcia Patent 1,470,272, dated October 9, 1923, wherein the accelerator pedal or equivalent manually operated device serves to operate both the throttle and a vacuum operated clutch controlling mechanism.

However, with the patented structure there is no provision for timing the operation of the throttle with respect to the clutch, the two being operated in the same manner and at the same relative times, irrespective of the mode of operation of the accelerator pedal.

With the conventional clutch and throttle control structure as now employed on the modern passenger vehicle the operator carefully releases the clutch pedal as he depresses the accelerator pedal, the relative movement of the two depending upon the speed of the vehicle if moving, or the position and weight of the vehicle if parked. The resulting slippage of the clutch effects a smooth control of the power transmission mechanism of the vehicle.

It is the principal object of the present invention to provide, in a construction generally similar to that of the aforementioned Belcia patent, means for determining the relative timing of the clutch and throttle controls to thereby as nearly as possible simulate the corresponding manual operation.

To the above end there is provided a check mechanism for timing the operation of the throttle, depending upon the mode of actuation of the accelerator pedal. Cooperating with this construction there is provided means interconnecting the control valve of the power clutch mechanism and the aforementioned pedal whereby the clutch is engaged as the throttle is opened.

In its broadest aspect the invention comprehends the provision of means permitting a variation of the relative clutch and throttle timing, and which variation is a function of either the mode of operation of the accelerator pedal or the predetermined calibration of a valve setting.

Other objects of the invention and desirable details of construction and combinations of parts will become apparent from the following detailed description of a preferred embodiment of the invention taken in conjunction with the accompanying drawing, in which.

Figure 1:
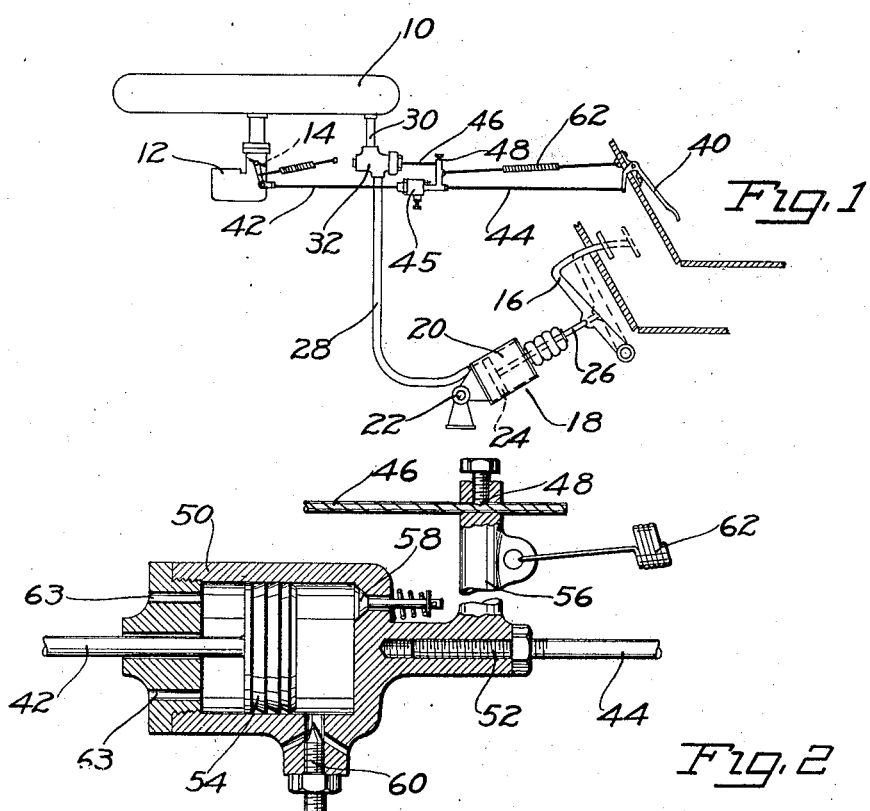
Figure 1 is a diagrammatic view of the clutch and throttle control mechanism constituting the invention.

As illustrated in the accompanying drawing, there is disclosed in Figure 1 the intake manifold 10 of the usual internal combustion engine, not shown, the latter provided with a carburetor 12 having the usual spring returned butterfly valve member 14. The conventional clutch pedal 16 is, in the present invention, power operated by a vacuum controlled fluid motor 18 comprising a cylinder 20 pivotally secured to the chassis at 22. The piston 24 of the motor is connected to the clutch pedal by rod 26.

The air within the motor or actuator 18 is evacuated by means of the pumping action of the cylinders of the internal combustion engine at closed throttle, the actuator being placed in circuit with the evacuated manifold by means of conduits 28 and 30 and interconnected control valve 32. This valve, which forms no part of the present invention, being covered by an application of Victor W. Kliesrath, No. 568,081, filed October 10, 1931, briefly comprises a reciprocating piston valve member 34 alternately placing the actuator in circuit with the manifold or atmosphere via openings 36 or 38 respectively, depending upon the position of the accelerator pedal 40 to which the valve member 34 is positively connected.

The accelerator pedal 40 is connected to the butterfly valve 14 of the carburetor 12 by means of links 42 and 44 and interconnected dashpot member 45 and to the actuator control valve by link 46 having a set screw connection 48 with the aforementioned dashpot device. In general, the aforementioned structure is similar to the patented structure of the Belcia Patent No. 1,470,272 in that actuation of the accelerator pedal serves to synchronize the engagement of the clutch and opening of the throttle, release of the pedal effecting synchronized closing of the throttle and disengagement of the clutch.

Figure 2:
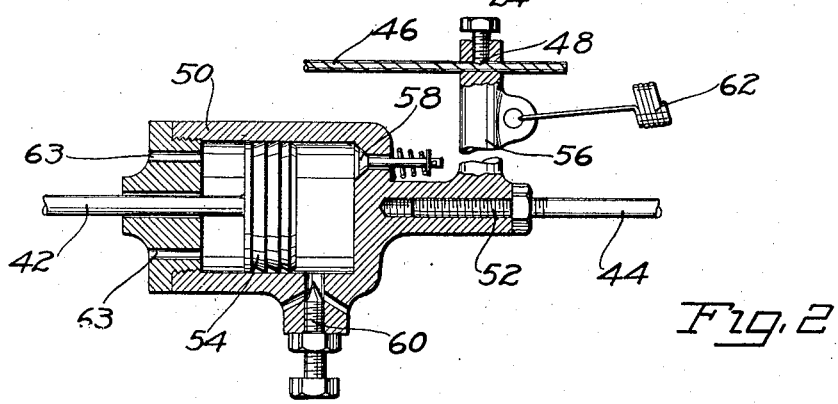
Figure 2 is a longitudinal sectional view disclosing the dashpot device for timing the throttle operation.
Figure 3:
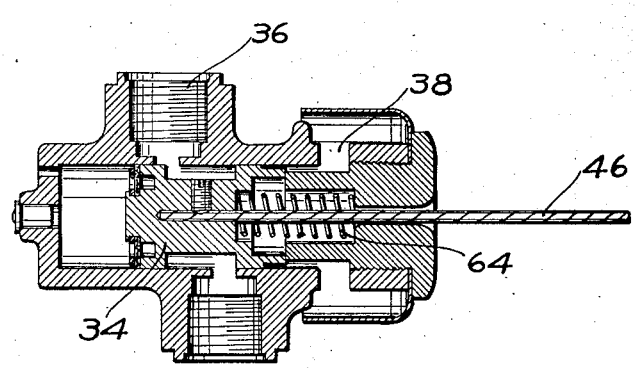
Figure 3 is a longitudinal sectional view disclosing the details of the power clutch control valve.

The present invention constitutes an improvement upon the aforementioned structure in the provision of the dashpot in the connection between the throttle and accelerator pedal. This device comprises a cylinder member 50, Figure 2, adjustably connected to the accelerator link member 44 by a threaded connection 52, the piston 54 of the device being directly connected to the throttle link 42. A stem portion 56, integral with the cylinder 50, provides a means for the aforementioned set screw connection 48 with the valve 32. An inlet valve 58 and a needle valve 60 complete the dashpot structure, the respective functions of said valves being described in detail hereinafter.

In describing the operation of the above described throttle and clutch mechanism, it will be noted that with the accelerator pedal released, as shown in Figure 1, that the clutch is disengaged, this by virtue of the opening of the valve by the action of return spring 62, which is stronger than valve spring 64. The clutch is thus disengaged with the engine idling and the accelerator pedal released, and this condition may exist with either the car parked or in motion.

Should it now be desired to start the car from rest or increase its speed if moving, the accelerator pedal is depressed, overcoming spring 62 and permitting the compressed valve spring 64 to expand and close the valve to vent the actuator 18 and permit the clutch to engage.

Relative to the operation of the throttle, if the accelerator pedal is slowly depressed the valve 32 will be opened to atmosphere and the clutch engaged before the piston 54 bottoms in the cylinder 50, this by virtue of the slow egress of air permitted by the calibration of the needle valve 60. Slow accelerator pedal movement will thus effect a clutch engagement before the throttle is appreciably opened. This operation is desirable with the vehicle starting from rest or moving at slow speed, there being a relatively slow R. P. M. of the driven clutch plate.

With the vehicle "free wheeling" or coasting at higher speeds in high gear there is a relatively high R. P. M. of the driven clutch plate, necessitating a speeding up of the motor before the clutch is engaged. Under these conditions the accelerator pedal is quickly depressed, thereby opening the throttle to speed up the engine before the air has leaked out of the cylinder 50 through the valve 60. The throttle is thus opened before the clutch is engaged, which is the condition desired, that is to as nearly as possible step up the R. P. M. of the driving clutch plate to equal that of the driven plate. The inlet valve 58 is provided together with openings 63 to obviate any dashpot effect or drag in the movement of the accelerator pedal.

The above described construction thus provides means for varying the relative timing of the clutch and throttle, which timing can be changed either by manual adjustment of the needle valve or by the mode of operation of the accelerator pedal.

While one illustrative embodiment has been described, it is not our intention to limit the scope of the invention to that particular embodiment, or otherwise than by the terms of the appended claims.

We claim:

1. Control mechanism for an automotive vehicle provided with a throttle and a clutch, said control mechanism comprising means for operating the clutch and other means for operating the throttle, said throttle operating means comprising an adjustable dashpot for varying the relative timing of operation of the throttle and clutch.

2. Control mechanism for an automotive vehicle provided with a throttle and a clutch comprising vacuum operated power means for operating the clutch and manually operated means for operating the throttle, said throttle operating means comprising a dashpot device for varying the relative timing of operation of the clutch and throttle, said dashpot comprising manually adjustable means for varying the operation thereof.

3. Control mechanism for an automotive vehicle provided with a throttle and a clutch comprising vacuum operated power means for operating the clutch and other manually operated means for operating the throttle, said throttle operating means comprising relatively movable telescoping members functioning to vary the relative timing of operation of the clutch and throttle, together with means for varying the relative movement of said telescoping members.

4. In a control mechanism for an automotive vehicle provided with a throttle and clutch mechanism, a fluid operated mechanism for operating the clutch and a manually operated means for operating the throttle, said mechanism and means having a manually operated part in common, said throttle operating means comprising a fluid escapement controlled dashpot, one part of said dashpot connected to said aforementioned common part and another part of said dashpot being connected to the throttle.

5. In a control mechanism for an automotive vehicle provided with a throttle and clutch mechanism, a fluid operated mechanism for operating the clutch and a manually operated means for operating the throttle, said mechanism and means having a manually operated part in common, said throttle operating means comprising one part connected to said aforementioned common part and further comprising another part connected to the throttle, said parts being so constructed and arranged as to be capable of relative movement, one of said parts being provided with a valve member for determining the relative movement of said parts.

6. In a control mechanism for an automotive vehicle provided with a throttle and a clutch, means for operating the clutch and other means for operating the throttle, said latter means comprising a check device adapted to determine the time of initiation of throttle opening, said device including a needle valve adapted for calibration to vary the mode of operation of the check device.

7. In a control mechanism for an automotive vehicle provided with a throttle for controlling the vehicular speed, and further provided with a clutch, means for controlling the operation of both the throttle and clutch comprising a manually operable member and a connection interconnecting said manually operable member with the throttle, said connection including means, operable according to the mode of operation of said manually operable member, for determining the relative timing of operation of the throttle and clutch.

8. In a control mechanism for an automotive vehicle provided with a throttle for controlling the vehicular speed, and further provided with a clutch, means for controlling the operation of both the throttle and clutch comprising a manually operable member and a connection interconnecting said manually operable member with the throttle, said connection including a fluid operated dashpot mechanism, one part of said dashpot being secured to said manually operable member and another part of said dashpot being secured to the throttle, said dashpot being operable according to the mode of operation of said manually operable member, for determining the relative timing of operation of the throttle and clutch.

9. In a control mechanism for an automotive vehicle provided with a throttle and a clutch, means for operating said throttle and clutch comprising a manually operable member and a connection interconnecting said manually operable member with the throttle, said connection including pneumatically operable means, operable according to the pressure applied to said manually operable member, for determining the relative timing of operation of the throttle and clutch.

10. The combination with a motor vehicle having an engine, an engine throttle valve, a throttle valve actuating mechanism and a clutch, means controlled by said actuating mechanism for disengaging and engaging the clutch, said clutch being disengaged when said actuating mechanism is in "off" position, and dash-pot means forming a part of the throttle actuating mechanism and whereby the vehicle operator may cause the clutch to be engaged either before or after opening said throttle valve.

11. The combination with a motor vehicle engine having a throttle valve controlled intake manifold, of a clutch, a suction motor for disengaging the clutch, said motor being connected to the intake manifold, a valve for controlling said suction motor, a throttle valve actuating mechanism, said actuating mechanism being connected to said valve to so control the valve that the clutch will be disengaged when the actuating mechanism is in "off" position, and dash-pot means in the actuating mechanism whereby the vehicle operator may during the initial movement of the actuating mechanism open said throttle valve either after or simultaneously with the actuation of the suction motor valve.

12. The combination with a motor vehicle having an engine, a throttle valve for said engine, a throttle valve actuating mechanism and a clutch, power means for disengaging the clutch, said power means being controlled by said actuating mechanism and the clutch being disengaged when said actuating mechanism is in "off" position, means connecting the actuating mechanism and the throttle valve and comprising a pair of relatively movable members, and means for retarding the relative movement of said members comprising a collapsible vented fluid containing chamber interposed between said members.

13. The combination with a motor vehicle having an engine, a throttle valve for said engine, a throttle valve actuating mechanism and a clutch, power means controlled by the actuating mechanism for disengaging the clutch, said clutch being disengaged when said actuating mechanism is in "off" position, means comprising relatively movable members forming a lost motion connection between the actuating mechanism and the throttle valve, and means for retarding the relative movement of the members of the lost motion connection.

14. The combination with a motor vehicle having an engine, a throttle valve for said engine, an accelerator pedal for actuating the throttle valve and a clutch, power means for disengaging the clutch, said clutch being disengaged when said pedal is in "off" position, a control element for the power means connected to be moved by the accelerator when the latter is actuated from "off" position in throttle opening direction, means forming a lost motion connection between the accelerator and the throttle valve permitting a small initial movement of the accelerator without actuating the throttle when said movement is made slowly but causing the throttle to move with the accelerator when said initial movement is made rapidly.

15. In an automatic control means for the actuation of the clutch of an automotive vehicle, the combination with the intake system, the carburetor throttle, and a mechanism for operating the carburetor throttle, of a pressure responsive means, means providing a passage between said intake system and said pressure responsive means, means when the motor is idling to open said passage whereby vacuum from said intake system actuates said pressure responsive means to release said clutch, means operating upon the actuation of said mechanism for operating the carburetor throttle to reduce the vacuum acting on said pressure responsive means whereby said clutch is moved toward engaged position, means operative when said mechanism for operating the carburetor throttle is operated rapidly to open said throttle valve sooner, with reference to the reduction of vacuum on said pressure responsive means, than when said mechanism for operating the carburetor throttle is operated slowly.

16. In an automatic control means for the clutch of an automotive vehicle, the combination with the intake system, the carburetor throttle, and a mechanism for operating the carburetor throttle, of a pressure responsive means for releasing the clutch, means providing a passage between said intake system and said pressure responsive means, means when the motor is idling to open said passage whereby vacuum from said intake system actuates said pressure responsive means to release said clutch, means operating upon the actuation of said mechanism for operating the carburetor throttle to reduce the vacuum acting on said pressure responsive means whereby said clutch is moved toward engaged position, a cylinder slidably receiving a piston, one side of said elements being attached to the throttle valve or its linkage, and the other being attached to be actuated by said mechanism for operating the carburetor throttle, means providing a passage from said cylinder to the atmosphere.

HAROLD W. PRICE.
EARL R. PRICE.